United States Patent

Hayami

[11] Patent Number: 5,940,105
[45] Date of Patent: Aug. 17, 1999

[54] MOTOR DRIVE CONTROLLING METHOD FOR AN IMAGE FORMING APPARATUS AND MOTOR DRIVE CONTROLLING APPARATUS IN THE IMAGE FORMING APPARATUS USING THE METHOD

[75] Inventor: Kazuyuki Hayami, Ushiku, Japan

[73] Assignee: Canon Kabushiki Kaisha, Tokyo, Japan

[21] Appl. No.: 08/788,261

[22] Filed: Jan. 24, 1997

[30] Foreign Application Priority Data

Jan. 26, 1996 [JP] Japan .................................. 8-012290
Dec. 6, 1996 [JP] Japan .................................. 8-326778

[51] Int. Cl.$^6$ .............................. B41J 2/01; G01D 15/16; G01D 15/18
[52] U.S. Cl. .............................. 347/104; 346/139
[58] Field of Search .................................. 347/104, 105; 400/322; 371/41; 341/116; 101/483; 318/603; 346/139 A

[56] References Cited

U.S. PATENT DOCUMENTS 4,966,075  10/1990  Brian ........................................ 101/211
5,711,225   1/1998  Rasmussen .............................. 101/483

FOREIGN PATENT DOCUMENTS 558236  9/1993  European Pat. Off. .................. 347/43

*Primary Examiner*—N. Le
*Assistant Examiner*—Thinh Nguyen
*Attorney, Agent, or Firm*—Fitzpatrick, Cella, Harper & Scinto

[57] ABSTRACT

A motor drive controlling apparatus in an image forming apparatus for effecting recording with a member to be conveyed being conveyed with a servo-motor as a drive source is provided with a conveying roller for driving an endless belt for conveying the member to be conveyed, a first encoder for detecting the rotational speed of the servo-motor for driving the conveying roller, and a second encoder for detecting the rotative operating position of the conveying roller, and feedback speed control for speed control is effected on the basis of the output signal of the first encoder and feedback position control for the control of the rotative operating position of the conveying roller is effected on the basis of the output signal of the second encoder.

19 Claims, 9 Drawing Sheets

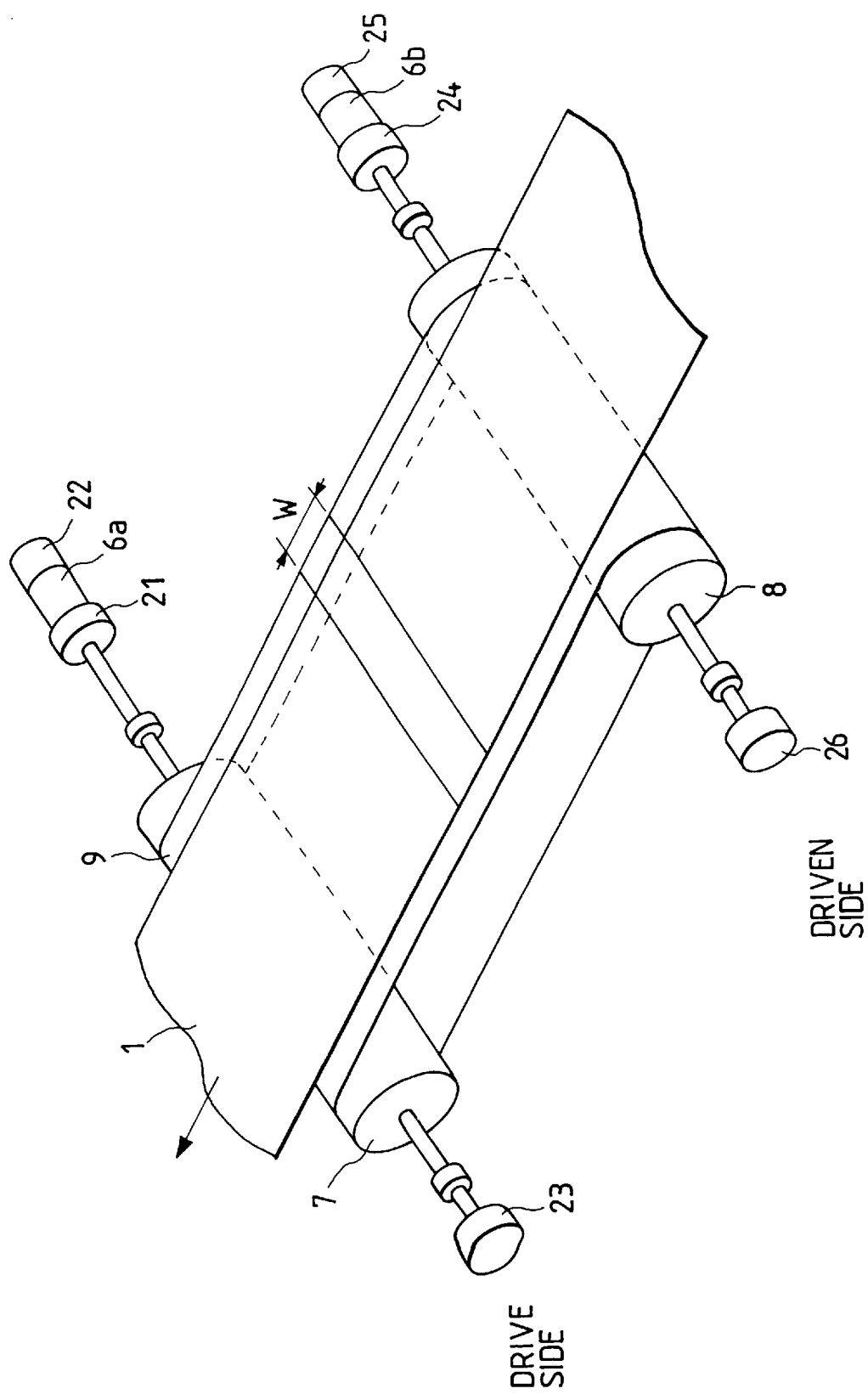

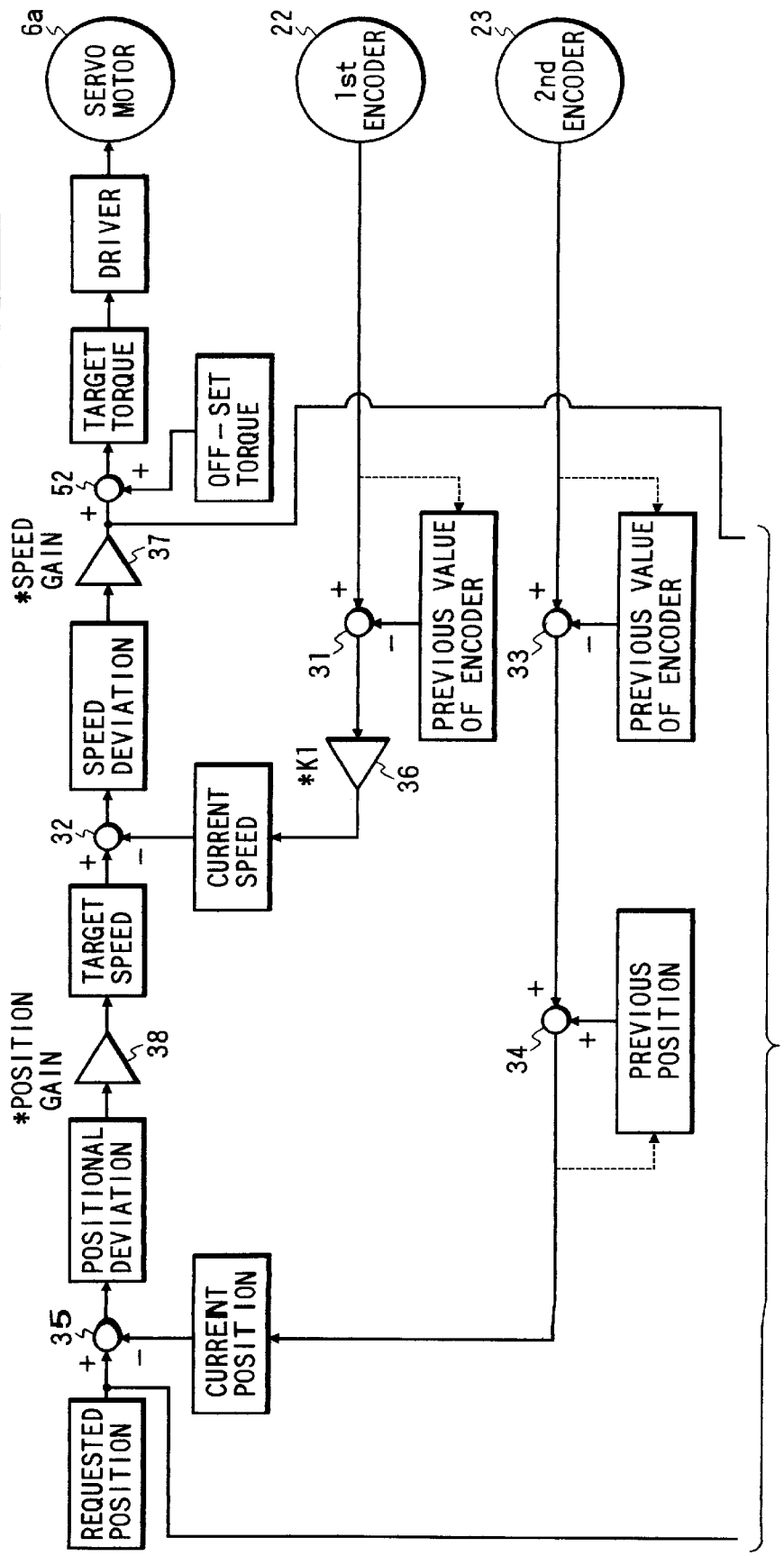

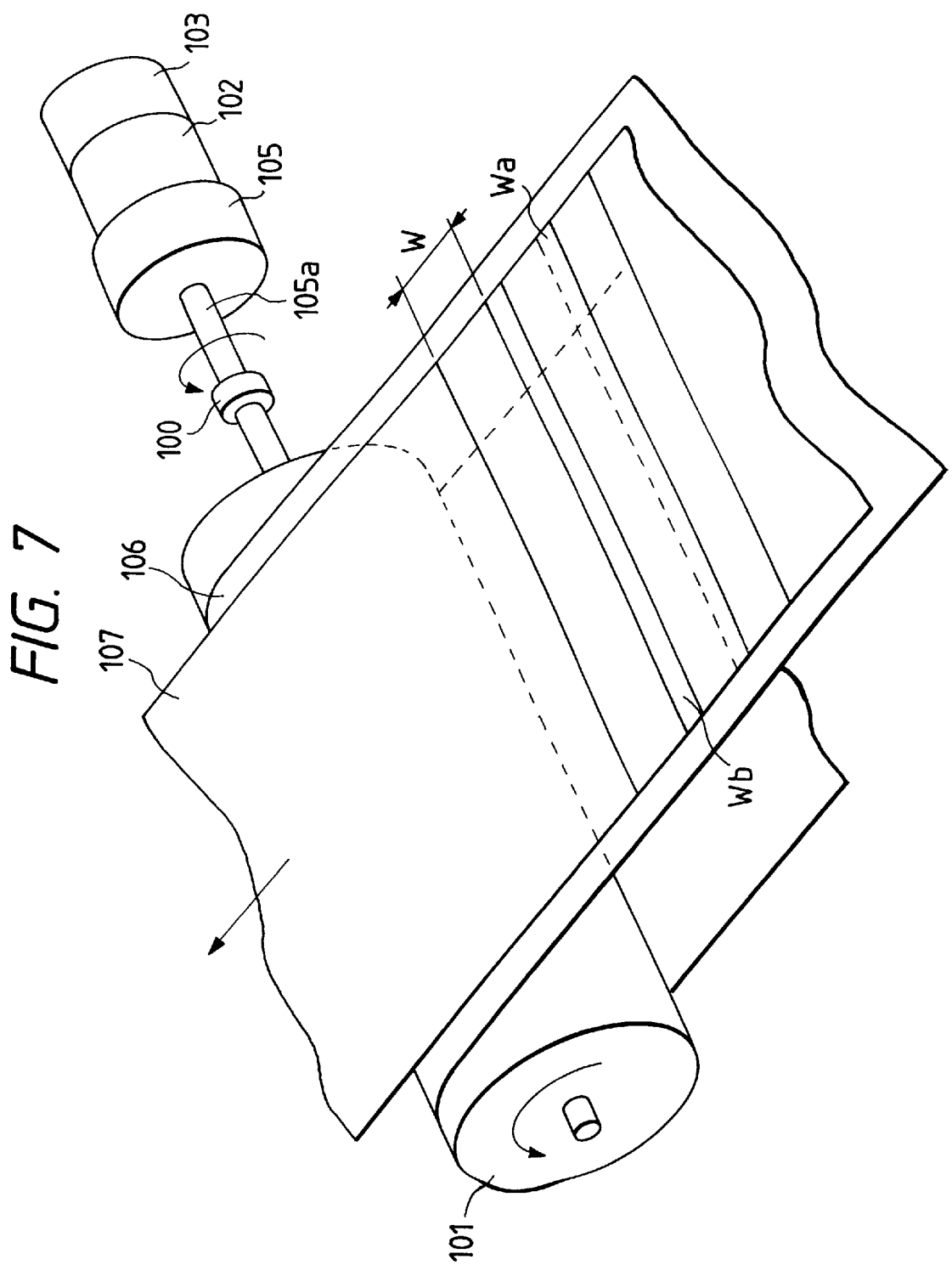

MOTOR DRIVE CONTROLLING METHOD FOR AN IMAGE FORMING APPARATUS AND MOTOR DRIVE CONTROLLING APPARATUS IN THE IMAGE FORMING APPARATUS USING THE METHOD

BACKGROUND OF THE INVENTION

1. Field of the Invention

This invention relates to a motor drive controlling method for an image forming apparatus suitable for an applying apparatus used, for example, in a textile printing machine, and a motor drive controlling apparatus in the image forming apparatus using the same method.

2. Related Background Art

Use has heretofore been made of an apparatus for applying predetermined paint to cloth continuously conveyed by a belt conveyor apparatus, over a predetermined width in a direction orthogonal to the direction of conveyance by the use of an applicator for applying the predetermined paint over a predetermined width. Describing such an apparatus briefly with reference to the accompanying drawings, FIG. 7 is a pictorial perspective view showing the general construction of a mechanism. FIG. 8 is a control block diagram connected to FIG. 7.

Referring first to FIG. 7, a roller 101 is rotatably supported in a base portion, not shown, and the output shaft 105a of a speed reducer 105 mounted on a servo-motor 102 is fixed to one end of the rotary shaft of the roller 101 through a coupling 100. A first encoder 103 is directly connected to the output shaft of the servo-motor 102. An endless belt 106 having its other end supported by a roller, not shown, is extended over the roller 101, and as shown, cloth 107 is stuck on the endless belt 106 so that paint may be applied onto the cloth 107 over a predetermined width W in a direction orthogonal to the direction of conveyance of the endless belt 106 by a paint applying apparatus, not shown.

On the other hand, in FIG. 8, the feedback control of a speed control loop and a position control loop is effected on the basis of a signal outputted from the first encoder 103, and the servo-motor 102 is driven by a predetermined amount each and the roller 101 is rotated in the direction of arrow by a rotational speed decelerated by the speed reducer 105, whereby the paint is applied to the cloth 107 cover an application width W while the cloth 107 is conveyed.

However, according to the conventional drive controlling system described above, an angular transmission error occurs due to the accumulation or the like of backlash occurring among a number of transmission gears for constituting the speed reducer 105. As a result, the amount of rotation of the servo-motor 102 cannot finally be transmitted to the roller 101 and an error occurs to the rotational angle of the roller 101 and thus, it becomes impossible to highly accurately feed the cloth 107 immovably stuck on the endless belt 106, and this has led to the problem that an overlap portion Wa occurs to the application width W over which the paint is to be applied by the applying apparatus or a void portion Wb is created.

SUMMARY OF THE INVENTION

It is an object of the present invention to solve the above-noted problem and to improve the drive position accuracy of a driving system driven by a servo-motor of feedback control.

It is another object of the present invention to provide an encoder for detecting the moved position of a conveying roller, discretely from an encoder for directly detecting the rotational speed of a motor, to thereby effect the feedback control of the motor.

It is still another object of the present invention to provide not only a conveying roller corresponding to a drive side, but also a conveying roller corresponding to a driven side by a servo-motor, and effect the two-axis synchronous control of these two servo-motors.

Other objects of the present invention will become apparent from the following detailed description of some specific embodiments of the invention.

BRIEF DESCRIPTION OF THE DRAWINGS

FIG. 5 shows the construction of a motor drive controlling apparatus for the conveying drive apparatus shown in FIG. 1 according to a second embodiment of the present invention.

FIG. 7 shows the construction of a motor drive controlling apparatus according to the prior art for effecting the conveyance driving of an image forming apparatus.

DESCRIPTION OF THE PREFERRED EMBODIMENTS

Some embodiments of the present invention will hereinafter be described with reference to the drawings.

Figure 1:
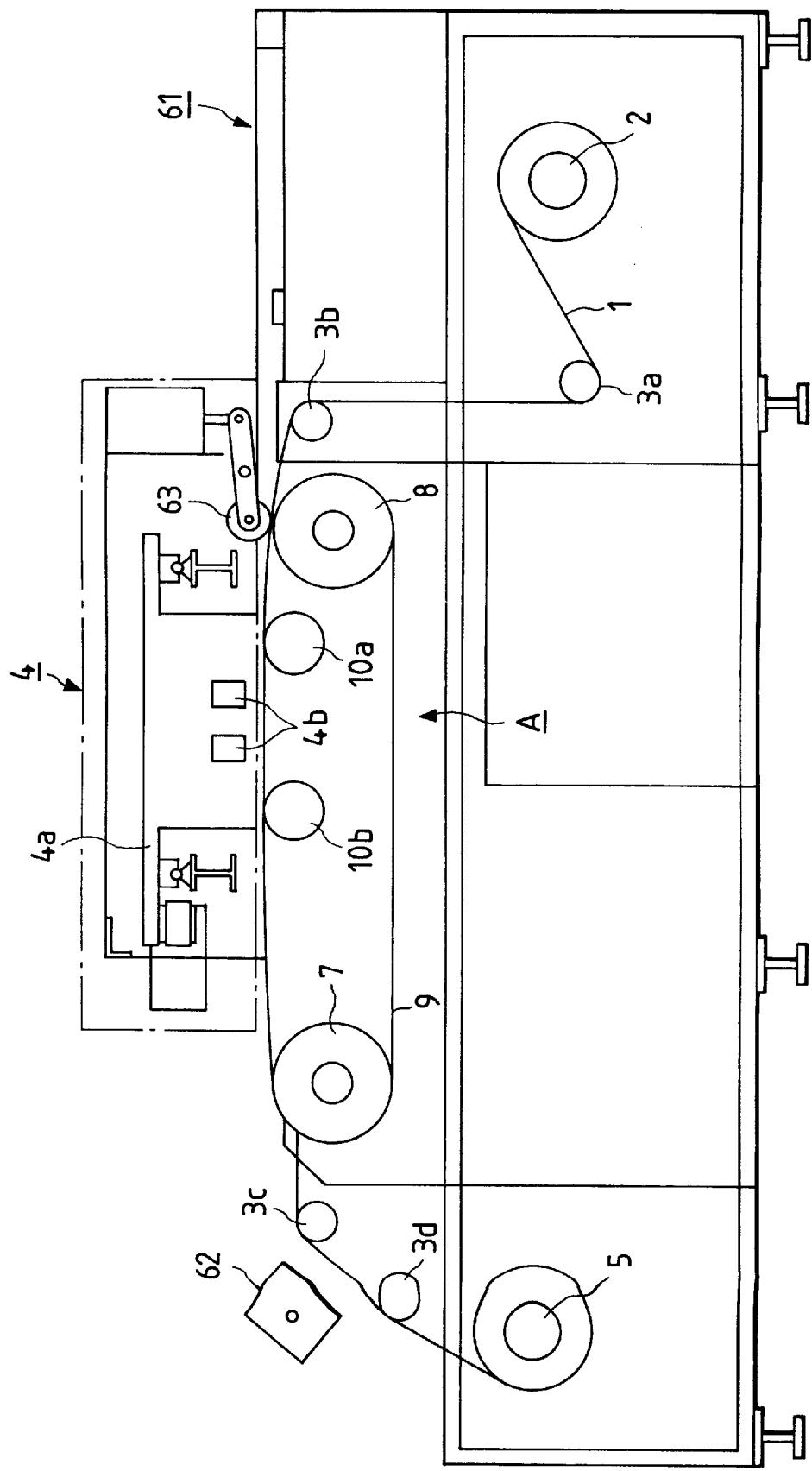
FIG. 1 shows the general construction of an image forming apparatus according to the present invention.

FIG. 1 shows the general construction of an image forming apparatus according to the present invention. In FIG. 1, the image forming apparatus is designed such that a length of cloth 1 is conveyed as a member to be conveyed and recording is effected thereon, and the cloth 1 wound in the form of a roll is sequentially paid away onto a conveying apparatus A by the rotation of a winding-off roller 2 through intermediate rollers 3a and 3b, and is conveyed by the conveying apparatus A and paint is applied to the cloth 1 by an applying apparatus 4 and after the application of the paint, the cloth 1 is taken up onto a take-up roller 5 through intermediate rollers 3c and 3d.

The conveying apparatus A is such that an endless belt 9 is extended between a first conveying roller 7 and a second conveying roller 8 and the endless belt 9 is moved round in a counter-clockwise direction as viewed in FIG. 1 and conveys the cloth 1. This endless belt 9 is formed of a non-metallic material such as reinforced rubber or the like, and a tacky layer is formed on the surface thereof. The cloth 1 paid away from the winding-off roller 2 is urged against and stuck on the tacky layer of the endless belt 9 by a sticking roller 63 and is conveyed without floating up from the belt 9.

The endless belt 9 is designed to be guided by platen rollers 10a and 10b in a predetermined range opposed to the recording head 4b of the applying apparatus 4 and appropriate tension is imparted to the belt 9 in this portion, whereby the cloth 1 is conveyed in a horizontal direction.

Recording means as the means of the applying apparatus 4 for applying the paint uses an ink jet recording system for discharging ink from the recording head 4b to thereby effect recording. That is, this recording head is provided with a minute liquid discharge port (an orifice), a liquid path, an energy acting portion provided in a portion of the liquid path, and energy generating means for generating liquid droplet forming energy caused to act on liquid in the acting portion.

As the energy generating means for generating such energy, there is a recording method using an electro-mechanical converting member such as a piezo element, a recording method using energy generating means for applying an electromagnetic wave such as a laser to thereby generate heat, and discharging a liquid droplet by the action of the generated heat, or a recording method using energy generating means for heating liquid by an electro-thermal converting member such as a heat generating element having a heat generating resistance member to thereby discharge the liquid.

Among them, a recording head used in an ink jet recording method of discharging liquid by heat energy permits liquid discharge ports (orifices) for discharging liquid droplets for recording and forming liquid droplets for discharge to be arranged highly densely and therefore can accomplish recording of high resolution. Particularly, a recording head using an electro-thermal converting member as energy generating means is easy to make compact and easy to mount highly densely, and is inexpensive to manufacture and therefore, is advantageous.

In the present embodiment, as a construction for discharging ink, design is made such that the electro-thermal converting member is electrically energized in conformity with a recording signal, and film boiling caused to the ink by the heat energy thereof is utilized to create an air bubble, and by the growth and contraction of the air bubble, the ink is discharged from a discharge port to thereby effect recording.

Two recording heads 4b are carried on a carriage 4a movable in a direction perpendicular to the plane of the drawing sheet of FIG. 1, and the carriage 4a is moved relative to the cloth 1 conveyed by the endless belt 9 and the ink is discharged from the recording heads 4b to thereby effect the application of a predetermined image. The applying apparatus 4 is movable also in the left to right direction as viewed in FIG. 1 so that the interchange or the like of the endless belt 9 can be done easily. Also, an HS station 61 for correcting the density irregularity of the recording heads 4b is provided in the aforementioned movement range of the applying apparatus 4.

The cloth 1 to which the predetermined image has been applied by the applying apparatus 4 is guided at the position of the first conveying roller 7 by the intermediate roller 3c and is thereby peeled from the adhesive layer of the endless belt 9, and is taken up onto the take-up roller 5. At this time, a heater 62 provided between the intermediate rollers 3c and 3d blows warm air against the cloth 1 to which the ink has been discharged by the recording means 4 to thereby dry the ink, whereafter the cloth 1 may be taken up onto the take-up roller 5. This heater 62 may be one which applies infrared rays in addition to blowing warm air.

Figure 2:
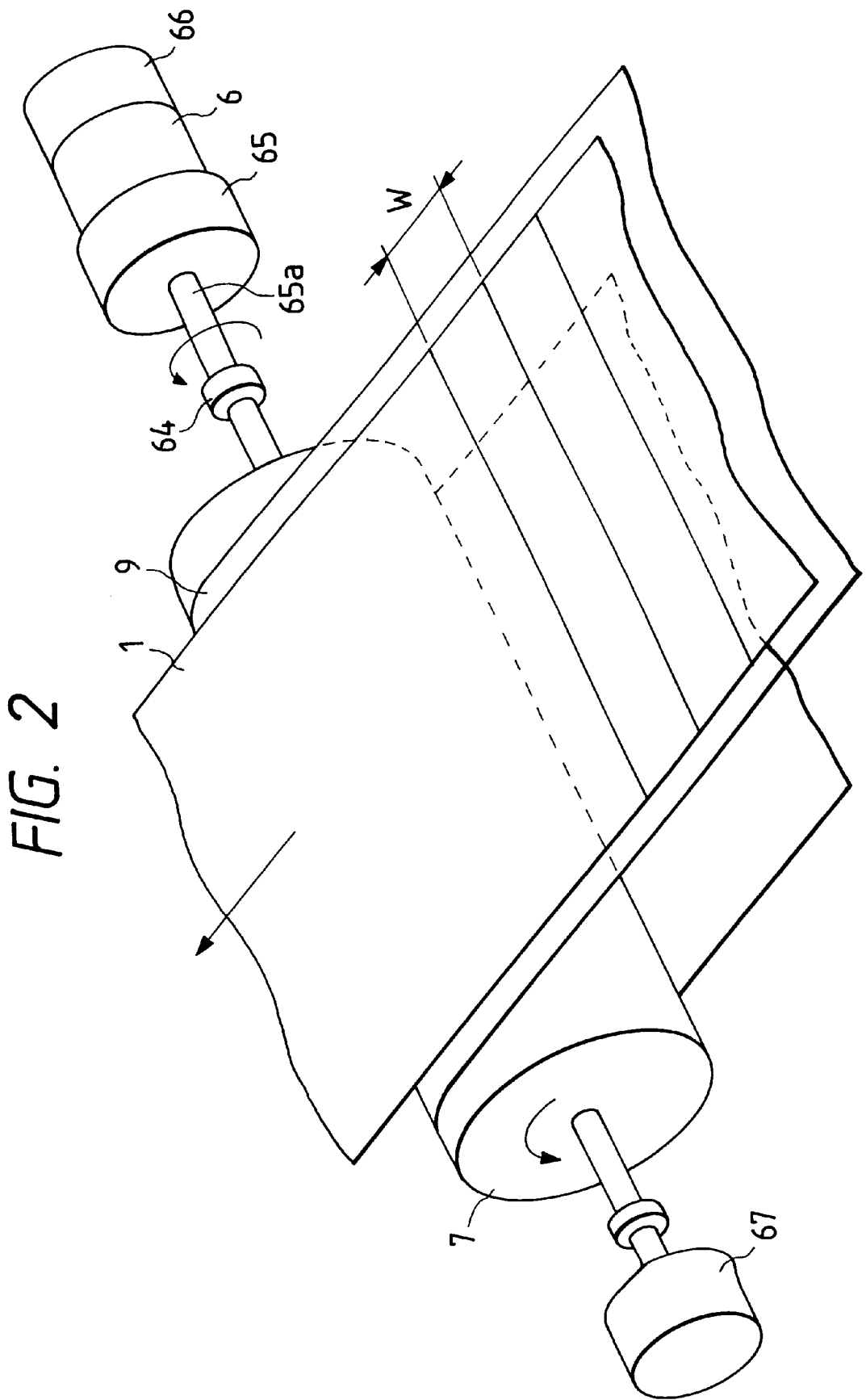
FIG. 2 shows the construction of a motor drive controlling apparatus for the conveying drive apparatus shown in FIG. 1 according to a first embodiment of the present invention.

FIG. 2 shows a motor drive controlling apparatus for the conveying drive portion shown in FIG. 1 according to a first embodiment of the present invention.

In FIG. 2, the reference numeral 6 designates a servo-motor, the reference numeral 7 denotes a first conveying roller rotatably supported on the apparatus, the reference numeral 1 designates cloth, and the reference numeral 9 denotes an endless belt for conveying the cloth 1.

One end of the first conveying roller 7 is fixed to the output shaft 65a of a speed reducer 65 mounted on the servo-motor 6 through a coupling 64. On the other hand, a first encoder 66 is directly connected to the output shaft of the servo-motor 6. Also, the endless belt 9 having its other end supported by a second conveying roller 8 is extended over the roller 7, and as shown, the cloth 1 is stuck on the endless belt 9, and design is made such that by an applying apparatus 4, paint is applied onto the cloth 1 over a predetermined width W in a direction orthogonal to the direction of conveyance (the direction of arrow in FIG. 2) of the endless belt 9. Also, a second encoder 67 is provided so as to be directly connected to the other end of the rotary shaft of the roller 7.

Figure 3:
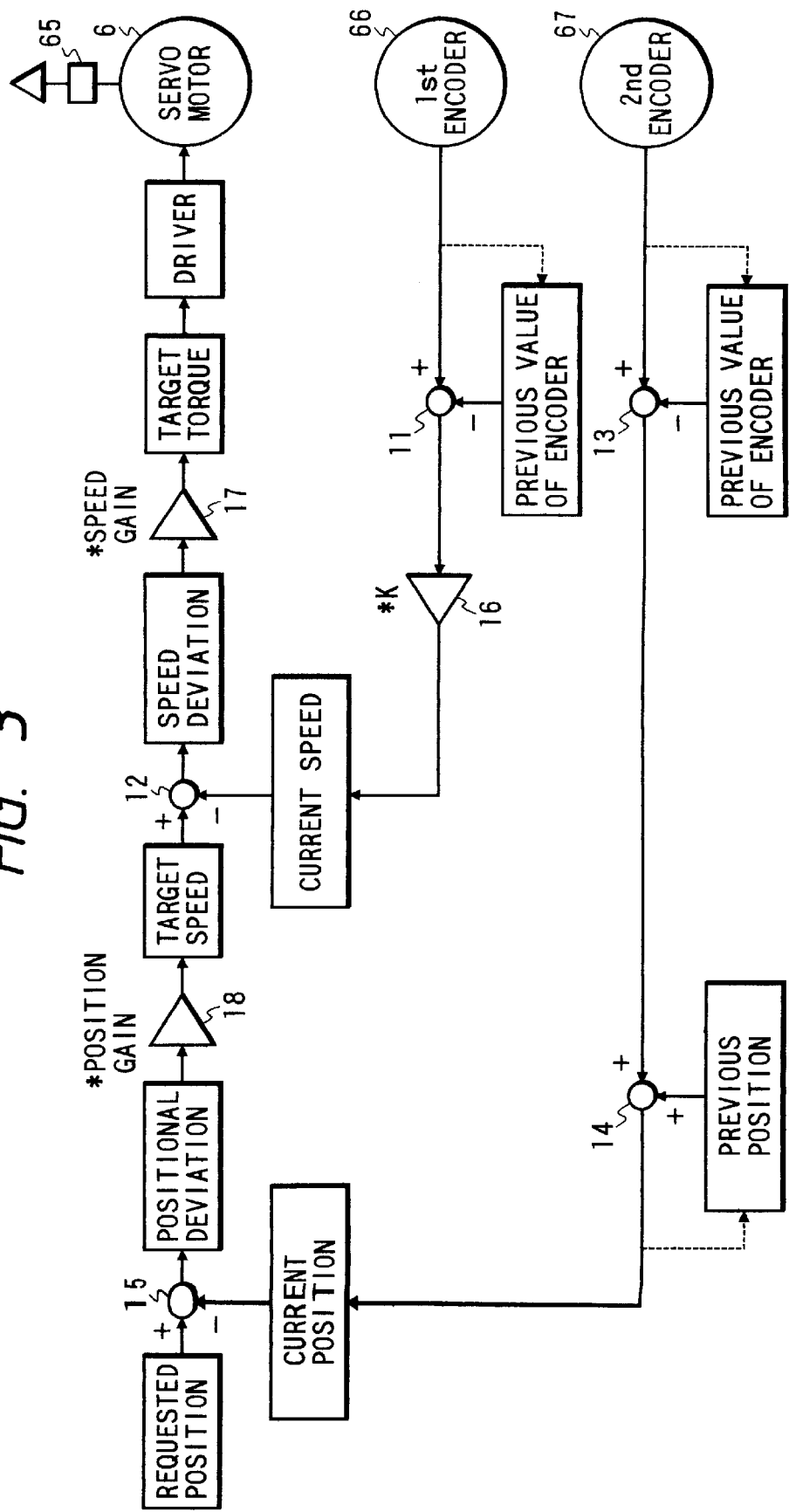
FIG. 3 is a control block diagram of the motor drive controlling apparatus shown in FIG. 1.

Referring now to FIG. 3 in addition to FIG. 2, design is made such that the feedback control of a speed control loop and a position control loop is effected on the basis of a signal outputted from the first encoder 66 and the servo-motor 6 is driven by a predetermined amount each and the roller 7 is rotated in the direction of arrow by the rotational speed decelerated by the seed reducer 65 to thereby apply the paint to the cloth 1 over an application width W while the cloth 1 is conveyed, and on the other hand, the feedback of the position control loop is effected by a signal from the second encoder 67.

Therefore, an encoder of the incremental type is used as the first encoder 66, and the value of the encoder created with the rotation thereof is subtracted from the previous value of the encoder at an adding point 11, whereafter it is inputted to an operational amplifier 16. In this operational amplifier 16, the signal of the first encoder 66 is read in, whereafter it is multiplied by a constant k which is a coefficient k obtained from the expression that k=the resolving power of the second encoder/(the resolving power of the first encoder×the speed reduction ratio of the speed reducer), whereby the current speed of the servo-motor 6 is obtained, and then is sent to an adding point 12. On the other hand, an encoder of the incremental type is also used as the second encoder 67 for detecting the position of the roller 7, and the value of the encoder created with the rotation of the roller 7 is subtracted from the previous value of the encoder at an adding point 13, whereafter the previous position is added at an adding point and the current position is sent to an adding point 15.

In the feedback system as described above, when a requested position for the predetermined drive rotation of the roller 7 is sent, a value indicative of the above-mentioned current position is subtracted from an absolute position based on a command signal to thereby obtain a positional deviation, which is sent to an operational amplifier 18. In this operational amplifier 18, the positional deviation is multiplied by a position gain to obtain a target speed. This target speed is subtracted from the value of the current speed at the adding point 12 to obtain a speed deviation. This deviation is sent to an operational amplifier 17, in which it is multiplied by a speed gain to obtain a target torque. From this target torque, a drive current value in a motor driver connected to the servo-motor 6 is set and the servo-motor 6 is driven.

In the manner described above, the servo-motor 6 is rotatively driven by a predetermined amount each, whereby in a state decelerated by the speed reducer 65, the cloth 1 stuck on the belt 9 is moved by a predetermined amount each through the roller 7 and thus, the paint can be applied to the cloth 1 over a predetermined width W in a direction orthogonal to the direction of conveyance of the belt 9 by the applying apparatus 4.

That is, in the speed control loop, the weight of the resolving power per pulse in the position control loop and the weight of the resolving power per pulse in the speed control loop are unified. While description has been made of an example designed such that the absolute position of the roller 7 is detected by the signal of the second encoder 67 directly connected thereto and the speed is detected by the signal of the first encoder 66 and position control is effected without being affected by the angle transmission error of the speed reducer 65, the present invention is of course not restricted thereto, but design can also be made such that for example, instead of the second encoder 67 for constituting the position control loop, a linear encoder for directly detecting the absolute position of the belt is juxtaposed along the lengthwise direction of the endless belt. Also, while description has been made above of a case where the cloth 1 is conveyed highly accurately and the overlap and void of the paint are prevented, the object to be conveyed is of course not restricted to cloth.

Figure 4:
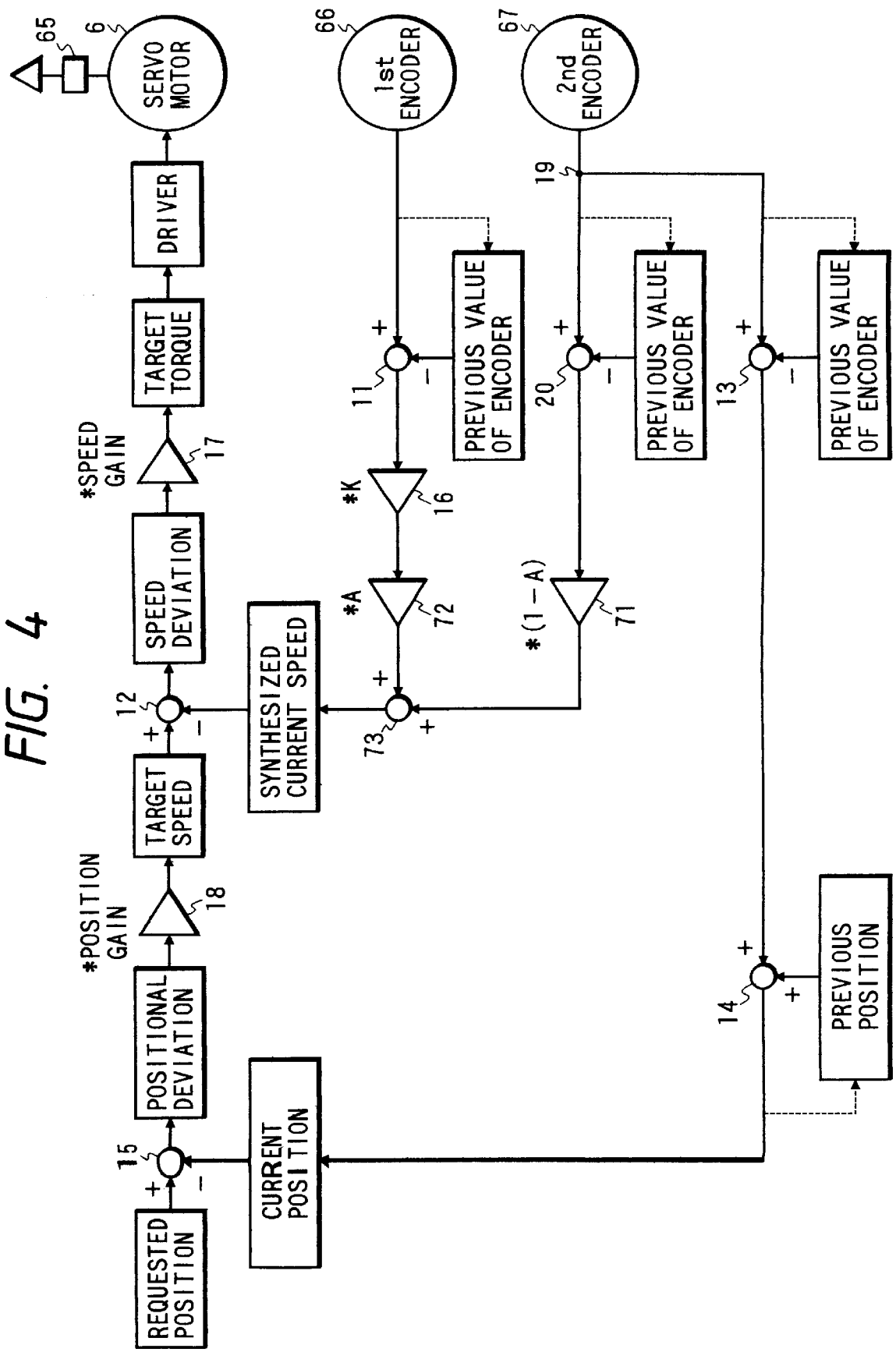
FIG. 4 is a diagram showing a modification of the control block shown in FIG. 3.

FIG. 4 shows a modification of the motor drive control block shown in FIG. 3, and in FIG. 4, the same portions as those shown in FIG. 3 are given the same reference numerals and need not be described specifically.

The feature of the control block shown in FIG. 4 is that both of the signal of the first encoder 66 and the signal of the second encoder 67 are used for the feedback of the speed control loop at a predetermined rate. Therefore, the signal of the second encoder 67 is divided at an extracting point 19 into a signal going toward the adding point 13 and a signal going toward an adding point 20, and is subtracted from the previous value of the encoder at the adding point 20, whereafter it is sent to an operational amplifier 71.

On the other hand, the value multiplied by the coefficient k in the operational amplifier 16 is a variable A in the speed control loop and is multiplied by a variable which becomes A=0-1, and then is sent to an adding point 73. Also, in the operational amplifier 71, it is multiplied by (1-A) and the rate of both of the signal of the first encoder 66 and the signal of the second encoder 67 is determined at the adding point 73.

According to the speed control loop thus constructed, both of the signal of the first encoder 66 and the signal of the second encoder 67 can be fed back to the speed control loop at a predetermined rate, and the mutual merit of effecting the stable speed control on the output shaft of the motor by the first encoder 66 and the detection of the speed of the roller 7 itself by the second encoder 67 becomes utilizable, and the roller can be rotated at a more stable speed.

That is, there has been the undesirable possibility that when feedback is effected by only the signal of the first encoder 66, speed irregularity occurs due to the angle transmission error of the speed reducer 65 because the speed of the roller 7 itself has been detected and that when feedback is effected by only the signal of the second encoder 67, the detection by the second encoder 67 is delayed in terms of time due to the angle transmission error of the speed reducer 65, the torsional rigidity of the roller 7 portion, etc. and oscillation is caused in the speed control loop, but such a problem does not arise in the present invention.

According to the first embodiment described above, even if a transmission mechanism such as a speed reducer is provided as coupling means for the servo-motor and the object to be driven by the servo-motor, the position of the object to be driven can be reliably detected. So, in the conveyor wherein the cloth is stuck on the belt, the cloth can be conveyed highly accurately and therefore, when the paint is to be applied to the cloth over a predetermined width in a direction orthogonal to the conveyance of the belt by the paint applying apparatus, the overlap and void of the paint can be prevented. Also, when the object to be driven is to be moved by a similar mechanical mechanism, the object to be driven can be moved at a stable speed.

In a driving system driven by the servo-motor which in turn is driven by feedback control, the accuracy of the driving position can be improved.

In addition, even when design is made such that a transmission mechanism such as a speed reducer in which an angular error occurs is provided as drive force transmitting means, the predetermined driving accuracy of the object to be driven can be ensured. Also, the object to be driven can be moved at a stable speed.

FIG. 5 shows a motor drive controlling apparatus for the conveying drive apparatus shown in FIG. 1 according to a second embodiment of the present invention.

In FIG. 5, the reference characters 6a and 6b designate servo-motors, the reference numerals 7 and 8 denote first and second conveying rollers rotatably supported on the apparatus, the reference numeral 1 designates cloth, and the reference numeral 9 denotes an endless belt for conveying the cloth 1.

A speed reducer 21 mounted on the servo-motor 6a is directly connected to one end of the first conveying roller 7, and a first encoder 22 is directly connected to the output shaft of the servo-motor 6a. A second encoder 23 is directly connected to the other end of the first conveying roller 7. Likewise, a speed reducer 24 mounted on the servo-motor 6b is directly connected to one end of the second conveying roller 8, and a third encoder 25 is directly connected to the output shaft of the servo-motor 6b. A fourth encoder 26 is directly connected to the other end of the second conveying roller 8. An endless belt 9 is extended over the first and second conveying rollers 7 and 8, and the cloth 1 is stuck on the belt 9, and design is made such that paint is applied to this cloth 1 over a predetermined width in a direction orthogonal to the direction of conveyance of the endless belt 9.

Figure 6B:
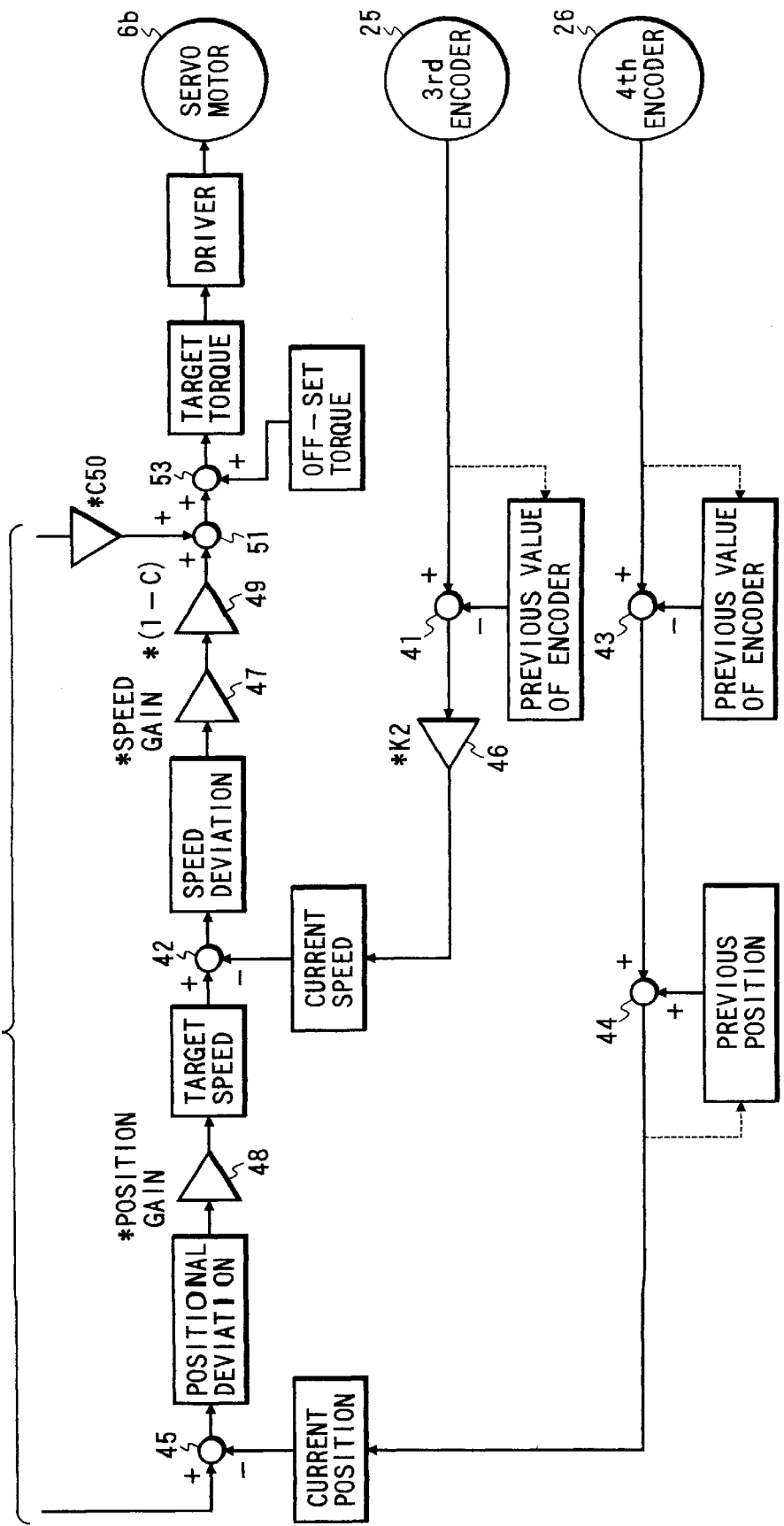
FIG. 6 is comprised of FIG. 6A and FIG. 6B showing control block diagrams of the motor drive controlling apparatus shown in FIG. 5.
Figure 8:
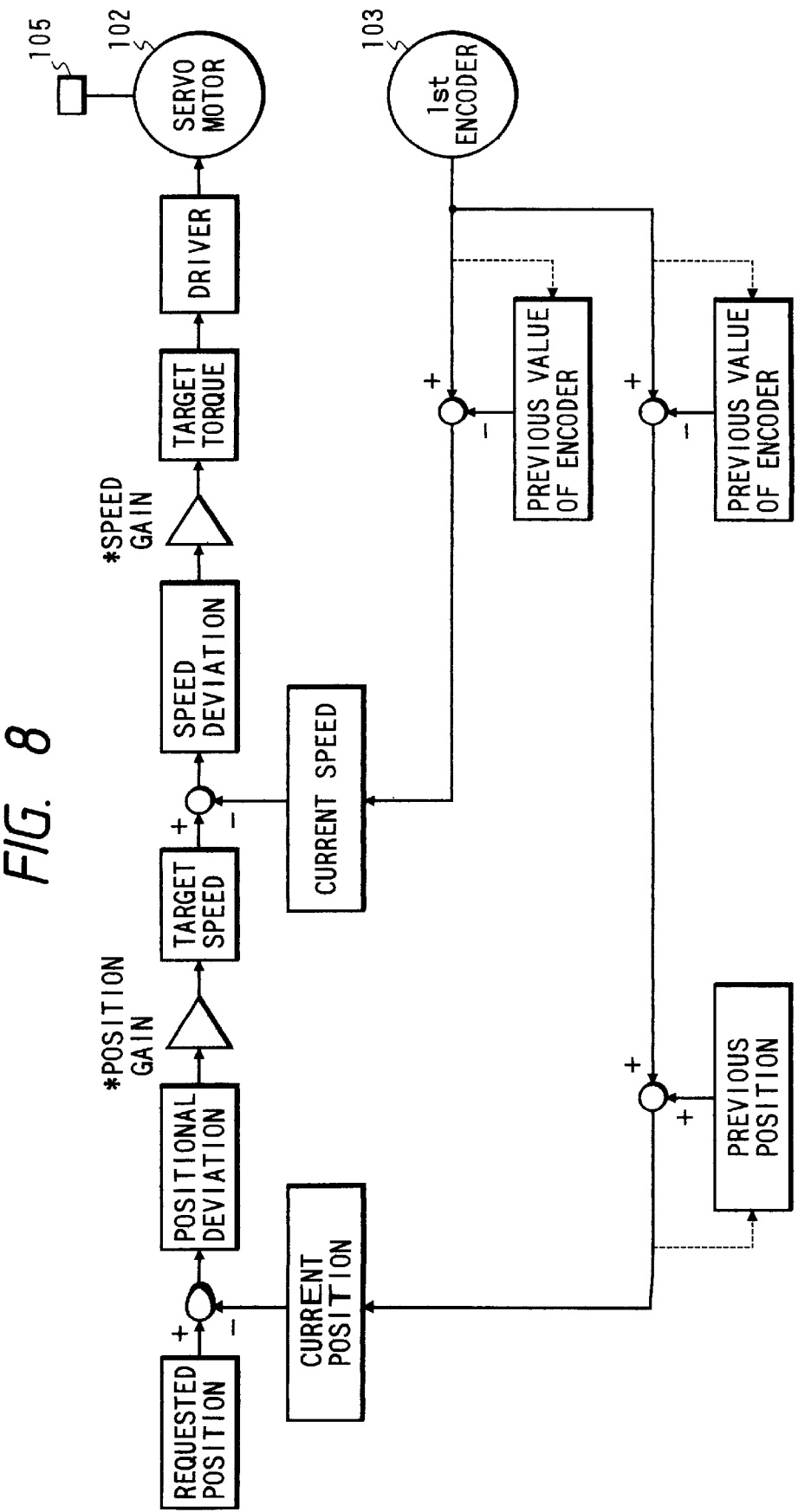
FIG. 8 is a control block diagram of the motor drive controlling apparatus shown in FIG. 7.

FIGS. 6A and 6B show the drive control circuit of the servo-motor shown in FIG. 5, and as regards the requested position, the same command is given to both of the first and second servo-motors 6a and 6b, and the first servo-motor 6a side effects the feedback position control of the position control loop by the second encoder 23 directly connected to the other end of the first conveying roller 7 and effects the feedback speed control of the speed control loop by the first encoder 22. Also, the second servo-motor 6b side effects the feedback position control of the position control loop by the fourth encoder 26 and effects the feedback speed control of the speed control loop by the third encoder 25.

An encoder of the incremental type is used as the first encoder 22, and the value of the encoder created with the rotation of the roller 7 is subtracted from the previous value of the encoder at an adding point 31, whereafter it is inputted to an operational amplifier 36. In this operational amplifier 36, the signal of the first encoder 22 is read in, whereafter it is multiplied by a constant $k_1$ which is a coefficient $k_1$ obtained from the expression that $k_1$=the resolving power of the second encoder/(the resolving power of the first encoder×the speed reduction ratio of the speed reducer), whereby the current speed of the servo-motor 6a is obtained, and then is sent to an adding point 32. On the other hand, an encoder of the incremental type is also used as the second encoder 23 for detecting the position of the first conveying roller 7, and at an adding point 33, the value of the encoder created with the rotation of the roller 7 is subtracted from the previous value of the encoder, whereafter at an adding point 34, the previous position is added thereto and the current position is sent to an adding point 35.

In the feedback system as described above, when a requested position for the predetermined drive rotation of the first conveying roller 7 is sent, a value indicative of the current position is subtracted from the absolute position based on the command signal at the adding point 35 to thereby find a positional deviation, which is sent to an operational amplifier 38. In this operational amplifier 38, the positional deviation is multiplied by a position gain to obtain a target speed. This target speed is subtracted from the value of the current speed at the adding point 32 to obtain a speed deviation. This deviation is sent to an operational amplifier 37, in which it is multiplied by a speed gain to obtain a target torque. From this target torque, a driving current value in a motor driver connected to the servo-motor 6a is set and the servo-motor 6a is driven.

Also, an encoder of the incremental type is used as the third encoder 25, and a value of the encoder created with the rotation is subtracted from the previous value of the encoder at an adding point 41, whereafter it is inputted to an operational amplifier 46. In this operational amplifier 46, the signal of the third encoder 25 is read in, whereafter it is multiplied by a constant $k_2$ which is a coefficient $k_2$ obtained from the expression that $k_2$=the resolving power of the fourth encoder/(the resolving power of the third encoder×the speed reduction ratio of the speed reducer), whereby the current speed of the servo-motor 6b is obtained, and then is sent to an adding point 42. On the other hand, an encoder of the incremental type is also used as the fourth encoder 26 for detecting the position of the second conveying roller 8, and a value of the encoder created with the rotation of the second conveying roller 8 is subtracted from the previous value of the encoder at an adding point 43, whereafter at an adding point 44, the previous position is added and the current position is sent to an adding point 45.

In the feedback system as described above, when a requested position for the predetermined drive rotation of the second conveying roller 8 is sent, a value indicative of the current position is subtracted from the absolute position based on the command signal at an adding point 45 to thereby find a positional deviation, which is sent to an operational amplifier 48. In this operational amplifier 48, the positional deviation is multiplied by a position gain to obtain a target speed. This target speed is subtracted from the value of the current speed at the adding point 42 to obtain a speed deviation.

The output of the operational amplifier 37 for the speed gain of the first servo-motor 6a side is multiplied by a variable C (C=0–1) in an operational amplifier 50 and is sent to an adding point 51, and is used as a torque command for the second servo-motor 6b side. The speed deviation obtained at the adding point 42 is sent to an operational amplifier 47, in which it is multiplied by a speed gain, and further in an operational amplifier 49, it is multiplied by (1−C) and is sent to the adding point 51, in which it is added to the output of the operational amplifier 50 to obtain a target torque. From this target torque, a driving current value in a motor driver connected to the second servo-motor 6b is set and the second servo-motor 6b is driven.

The target torque of each of the drive control systems of the first and second servo-motors 6a and 6b is designed such that an off-set torque is sent to adding points 52 and 53 so that control may be effected with a torque difference provided between the first and second servo-motors 6a and 6b.

The constants k1 and k2 of the speed control loop are designed to unify the weight of the resolving power per pulse in the position control loop and the weight of the resolving power per pulse in the speed control loop.

In the control system as described above, when a requested position for predetermined drive rotation is sent, the same command is given to the drive control systems of the first and second servo-motors 6a and 6b corresponding to the drive side and the driven side, respectively, and in each feedback system, position control and speed control are effected, and the command torque of the second servo-motor 6b corresponding to the driven side is made into the synthesized torque of the drive control systems of the first and second servo-motors 6a and 6b, whereby two-shaft synchronous control conforming to the movement of the drive control system of the first servo-motor 6a corresponding to the drive side is made possible. Also, in order to eliminate the influence of the slip and stretch of the endless belt, an off-set torque is added to the target torques of the first and second servo-motors 6a and 6b corresponding to the drive side and the driven side, respectively, to thereby provide a torque difference between the first and second servo-motors 6a and 6b and effect control.

As described above, there are provided a servo-motor controlling method and apparatus in which the first and second servo-motors 6a and 6b corresponding to the drive side and the driven side, respectively, are rotatively driven under two-shaft synchronous control in conformity with the command torque of the first servo-motor 6a corresponding to the drive side, whereby the slip and stretch of the endless belt 9 do not occur through the first and second conveying rollers 7 and 8 as they are decelerated by the speed reducers 21 and 24 and thus, the cloth 1 stuck on the endless belt 9 is moved by a predetermined amount each, and the position accuracy is improved and the paint can be applied to the cloth 1 over a predetermined width in a direction orthogonal to the direction of conveyance of the endless belt 9 by the applying apparatus and which are effective in a printing machine.

The foregoing description has been made of a case where the cloth 1 is conveyed highly accurately to thereby prevent the overlap and void of the paint, but the member to be conveyed is not restricted to cloth.

What is claimed is:

1. A motor drive controlling method for an image forming apparatus for effecting recording with a member to be conveyed being conveyed with a servo-motor as a drive source, comprising the steps of:

driving an endless belt for conveying said member to be conveyed by a conveying roller;

detecting a rotational speed of the servo-motor for driving the conveying roller through a speed reducer by a first encoder directly connected to the servo-motor;

detecting the rotative operating position of said conveying roller by a second encoder;

effecting the feedback speed control of the speed of the servo-motor on the basis of the output signal of the first encoder;

effecting the feedback position control of the rotated position of said conveying roller on the basis of the output signal of the second encoder; and the feedback speed control of said servo-motor being driven and controlled with both of the output signal of said first encoder and the output signal of said second encoder introduced at a predetermined rate.

2. A motor drive controlling method for an image forming apparatus according to claim 1, wherein said member to be conveyed is cloth stuck on said endless belt, and an applying apparatus for effecting application to said cloth over a predetermined width in a direction substantially orthogonal to the direction of movement is disposed.

3. A motor drive controlling method for an image forming apparatus according to claim 1, wherein said supplying apparatus has an ink jet recording head.

4. A motor drive controlling apparatus in an image forming apparatus for effecting recording with a member to be conveyed being conveyed with a servo-motor as a drive source, comprising:
a conveying roller for driving an endless belt for conveying said member to be conveyed;
a servo-motor for driving said conveying roller;
a speed reducer provided between the conveying roller and the servo-motor, the speed reducer transmitting a drive force of the servo-motor to the conveying roller;
a first encoder for detecting the rotational speed of said servo-motor, said first encoder being directly connected to the servo-motor;
a second encoder for detecting a rotative operating position of said conveying roller, said second encoder being directly connected to the conveying roller; and
control means for effecting feedback speed control for speed control on the basis of the output signal of the first encoder and effecting feedback position control for the control of the rotative operating position of said conveying roller on the basis of the output signal of the second encoder, said feedback speed control being driven and controlled with both of the output signal of said first encoder and the output signal of said second encoder introduced at a predetermined rate.

5. A motor drive controlling apparatus in an image forming apparatus according to claim 4, wherein said member to be conveyed is cloth stuck on said endless belt, and an applying apparatus for effecting application to said cloth over a predetermined width in a direction substantially orthogonal to the direction of movement is disposed.

6. A motor drive controlling apparatus in an image forming apparatus for effecting recording with a member to be conveyed being conveyed with a servo-motor as a drive source, comprising:
a conveying roller for driving an endless belt for conveying said member to be conveyed;
a servo-motor for driving said conveying roller;
a first encoder for detecting the rotational speed of said servo-motor;
a second encoder for detecting the rotative operating position of said conveying roller;
control means for effecting feedback speed control for speed control on the basis of the output signal of the first encoder and effecting feedback position control for the control of the rotative operating position of said conveying roller on the basis of the output signal of the second encoder being driven and controlled with both of the output signal of said first encoder and the output signal of said second encoder introduced at a predetermined rate; and
a speed reducer connected to said servo-motor and having a predetermined speed reduction ratio, and a moving mechanism connected to said speed reducer, wherein the output signal of said first encoder is multiplied by a constant k obtained from the constant k=the resolving power of the second encoder/the resolving power of the first encoder×the speed reduction ratio of the speed reducer to thereby effect said feedback speed control.

7. A motor drive controlling apparatus using the controlling method for the servo-motor according to claim 6, wherein said moving mechanism comprises a base, said speed reducer disposed on said base, a coupling connected to said speed reducer, a roller connected to said coupling and rotatably supported on said base and having said second encoder connected thereto, and a conveyer belt guided in a state extended over said roller, and said member to be conveyed is moved on said conveyer belt.

8. A motor drive controlling method for an image forming apparatus for effecting recording with a member to be conveyed being conveyed with a servo-motor as a drive source, comprising the steps of:
driving an endless belt for conveying said member to be conveyed by first and second conveying rollers;
detecting a rotational speed of first and second servo-motors for driving the first and second conveying rollers through a speed reducer, respectively, by first and third encoders directly connected to the first and second servo-motors;
detecting a rotational operation position of the first and second conveying rollers by second and fourth encoders directly connected to the first and second conveying rollers;
detecting the rotational speeds of first and second servo-motors for driving the first and second conveying rollers by first and third encoders, respectively;
detecting a rotative operating position of said first and second conveying rollers by second and fourth encoders, respectively;
effecting the feedback speed control of the speeds of the first and second servo-motors on the basis of the output signals of the first and third encoders;
effecting the feedback position control of the rotated positions of said firs and second conveying rollers on the basis of the output signals of said second and fourth encoders;
the feedback speed control of said first and second servo-motors introducing both of the output signals of said first and third encoders and the output signals of said second and fourth encoders being at a predetermined rate; and
driving and controlling the first servo-motor provided on the upstream side with respect to the direction of conveyance of said member to be conveyed by said endless belt with the feedback-speed-controlled result of said second servo-motor provided on the downstream side being introduced.

9. A motor drive controlling method for an image forming apparatus according to claim 8, wherein said member to be conveyed is cloth stuck on said endless belt, and an applying apparatus for effecting application to said cloth over a predetermined width in a direction substantially orthogonal to the direction of movement is disposed.

10. A motor drive controlling method for an image forming apparatus according to claim 9, wherein said applying apparatus has an ink jet recording head.

11. A motor drive controlling apparatus in an image forming apparatus for effecting recording with a member to be conveyed being conveyed with a servo-motor as a drive source, comprising:

first and second conveying rollers for driving an endless belt for conveying said member to be conveyed;

first and second servo-motors for driving said first and second conveying rollers, respectively;

first and second speed reducers provided between the first and second conveying rollers and the first and second servo-motors, the first and second speed reducers transmitting a drive force of the first and second servo-motors to the first and second conveying roller;

first and third encoders for detecting the rotational speeds of said first and second servo-motors, respectively, said first and third encoders being directly connected to the first and second servo-motors; and second and fourth encoders for detecting the rotative operating positions of said first and second conveying rollers, respectively, said second and fourth encoders being directed connected to the first and second conveying rollers;

feedback speed control for speed control being effected on the basis of the output signals of the first and third encoders and feedback position control for the control of the rotative operating positions of said first and second conveying rollers being effected on the basis of the output signals of the second and fourth encoders, and the first servo-motor provided on the upstream side with respect to the direction of conveyance of said member to be conveyed by said endless belt being driven and controlled with the feedback-speed-controlled result of said second servo-motor provided on the downstream side being introduced thereto.

12. A motor drive controlling apparatus in an image forming apparatus according to claim 11, wherein said feedback speed control introduces both of the output signals of said first and third encoders and the output signals of said second and fourth encoders at a predetermined rate.

13. A motor drive controlling apparatus in an image forming apparatus according to claim 11, wherein said member to be conveyed is cloth stuck on said endless belt, and an applying apparatus for effecting application to said cloth over a predetermined width in a direction substantially orthogonal to the direction of movement is disposed.

14. A motor drive controlling apparatus in an image forming apparatus according to claim 13, wherein said applying apparatus is used in a printing machine and has an ink jet recording head.

15. A motor drive controlling apparatus in an image forming apparatus according to claim 11, wherein said endless belt is comprised of a non-metallic member.

16. A motor drive controlling apparatus in an image forming apparatus for effecting recording with a member to be conveyed being conveyed with a servo-motor as a drive source, comprising:

first and second conveying rollers for driving an endless belt for conveying said member to be conveyed;

first and second servo-motors for driving said first and second conveying rollers, respectively;

first and third encoders for detecting the rotational speeds of said first and second servo-motors, respectively; and second and fourth encoders for detecting the rotative operating positions of said first and second conveying rollers, respectively;

feedback speed control for speed control being effected on the basis of the output signals of the first and third encoders and feedback position control for the control of the rotative operating positions of said first and second conveying rollers being effected on the basis of the output signals of the second and fourth encoders, and the first servo-motor provided on the upstream side with respect to the direction of conveyance of said member to be conveyed by said endless belt being driven and controlled with the feedback-speed-controlled result of said second servo-motor provided on the downstream side being introduced thereinto, and wherein command torques to said first and second servo-motors are obtained by calculating the feedback-speed-controlled result, and the command torque to said first servo-motor is obtained with the command torque to said second servo-motor introduced.

17. A motor drive controlling apparatus in an image forming apparatus for effecting recording with a member to be conveyed being conveyed with a servo-motor as a drive source, comprising:

a first drive roller provided on the upstream side with respect to the direction of conveyance of said member to be conveyed for imparting a drive force to an endless belt for conveying said member to be conveyed;

a second drive roller provided on the downstream side with respect to the direction of conveyance of said member to be conveyed for imparting a drive source to the endless belt for conveying said member to be conveyed;

first and second servo-motors for driving said first and second drive rollers, respectively;

first and second speed reducers provided between the first and second conveying rollers and the first and second servo-motors, the first and second speed reducers transmitting a drive force of the first and second servo-motors to the first and second conveying roller;

first and third encoders directly connected to said first and second servo-motors, respectively, for detecting the rotational speeds of the motors, said first and third encoders being directly connected to the first and second servo-motors; and second and fourth encoders for detecting the rotative operating positions of said first and second drive rollers, respectively, said second and fourth encoders being directly connected to the first and second conveying rollers;

feedback speed control for speed control being effected on the basis of the output signals of said first and third encoders and feedback position control for the control of the rotative operating positions of said first and second drive rollers being effected on the basis of the output signals of said second and fourth encoders, said first servo-motor being driven and controlled with the feedback-speed-controlled result of said second servo-motor introduced thereinto to thereby effect two-shaft synchronous control.

18. A motor drive controlling apparatus in an image forming apparatus according to claim 17, wherein said feedback speed control introduces both of the output signals of said first and third encoders and the output signals of said second and fourth encoders at a predetermined rate.

19. A motor drive controlling apparatus in an image forming apparatus for recording with a member to be conveyed by a conveying belt by driving the conveying belt for conveying the member with a servo-motor as a drive source force through a speed reducer, said controlling apparatus comprising:

a conveying roller for driving the conveying belt for conveying the member;

the servo-motor for driving the conveying roller;

a first encoder provided on the servo-motor to directly detect a rotational speed on the servo-motor;

a second encoder provided on a conveying portion such as the conveying belt of the conveying roller to detect operational position of the conveying portion; and control means for performing a feedback speed controlling for the rotational speed of the servo-motor on the basis of an output signal of the first encoder and performing a feedback position controlling for the operational position of the conveying portion on the basis of an output signal of the second encoder.

* * * * *

UNITED STATES PATENT AND TRADEMARK OFFICE
CERTIFICATE OF CORRECTION

PATENT NO. : 5,940,105

DATED : August 17, 1999

INVENTOR(S): KAZUYUKI HAYAMI, ET AL.

It is certified that error appears in the above-identified patent and that said Letters Patent is hereby corrected as shown below:

COLUMN 1,
Line 45, "cover " should read --over--.

COLUMN 4,
Line 26, "seed" should read --speed--.

COLUMN 10
Line 40, "firs" should read --first--.

COLUMN 11,
Line 19, "directed" should read --directly--.

Signed and Sealed this

Twenty-eighth Day of March, 2000

Attest:

Q. TODD DICKINSON

Attesting Officer    Commissioner of Patents and Trademarks